Apr. 3, 1923.

H. TROST 1,450,527

PISTON RING CLAMP

Filed Sept. 21, 1921

Inventor
H. Trost
By D. Swift
Attorney

Patented Apr. 3, 1923.

1,450,527

UNITED STATES PATENT OFFICE.

HARRY TROST, OF TROY, ILLINOIS.

PISTON-RING CLAMP.

Application filed September 21, 1921. Serial No. 502,158.

*To all whom it may concern:*

Be it known that I, HARRY TROST, a citizen of the United States, residing at Troy, in the county of Madison, State of Illinois, have invented a new and useful Piston-Ring Clamp; and I do hereby declare the following to be a full, clear, and exact description of the invention, such as will enable others skilled in the art to which it appertains to make and use the same.

The invention relates to piston ring clamps and has for its object to provide a device of this character comprising crossed handle members, one of the ends of each of said crossed handle members having connected thereto one end of a flexible piston ring engaging band adapted to encircle the piston ring and compress the ring when the free ends of the cross handle members are compressed together.

A further object is to connect the piston ring engaging flexible member to a loop detachably connected to one end of one of the crossed handle members, the other end of said flexible member extending through a loop carried by the end of the other handle member and provided with a plurality of apertures, in anyone of which apertures a lug is received, for holding the band.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1:
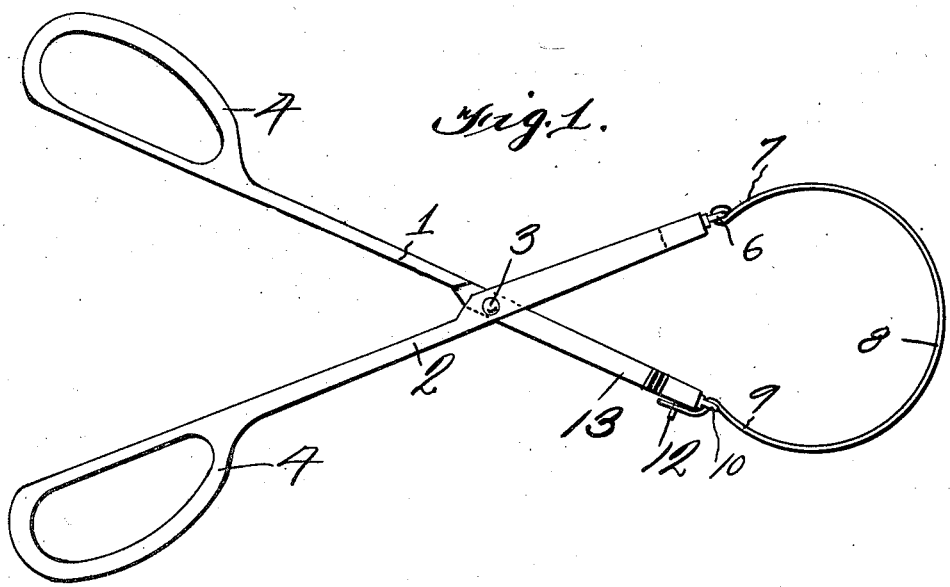
Figure 1 is a top plan view of the ring clamp.
Figure 2:
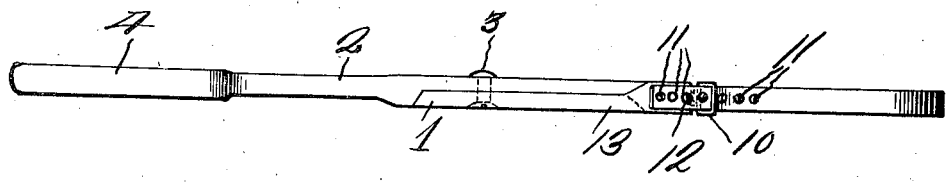
Figure 2 is a side elevation of the ring clamp showing the adjusting means for one end of the flexible band.
Figure 3:
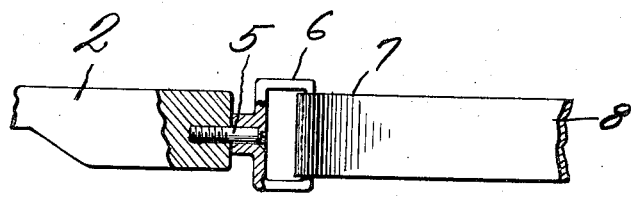
Figure 3 is a detail view partly in section and partly in elevation, showing the means for securing one end of the flexible band to one of the crossed handle members.

Referring to the drawings, the numerals 1 and 2 designate crossed handle members, which members are pivoted together at 3. The rear ends of the crossed members 1 and 2 are provided with finger receiving loops 4, which receive the fingers of the operator during a piston ring clamping and compressing operation, at which time the looped ends of the crossed members are moved together.

Detachably secured by means of a screw 5 to the forward end of the handle member 2 is a loop 6, to which loop is secured the end 7 of a flexible piston ring engaging band 8, which band engages the periphery of a piston ring and when contracted contracts the piston ring in such a manner that the piston ring may be securely held in contracted condition when the piston is being inserted in a piston head. The free end 9 of the flexible band 8 extends through a loop 10 carried by the forward end of the crossed handle member 1, and is provided with a plurality of apertures 11, in anyone of which apertures the lug 12 which extends outwardly substantially at a right angle from the outer face 13 of the crossed handle member 1 is received for holding the free end 9 of the band during a piston ring contracting operation. It will be seen that by providing the plurality of apertures that the band may be adjusted for clamping and compressing various sizes of split piston rings thereby allowing the same device to be used for different sized rings.

The invention having been set forth what is claimed as new and useful is:—

A piston ring clamp comprising a pair of crossed handle members, finger receiving loops at one end of said crossed handle members, a loop detachably connected to the end of one of said crossed handle members, a flexible band connected to said loop, a loop carried by the end of the other crossed handle member, the flexible band having one of its ends attached to the detachable loop, the free end of said flexible band being provided with a plurality of apertures, a lug extending outwardly at substantially a right angle from the outer face of one of the crossed handle members adjacent its loop and at a right angle to the loop and forming means for engaging in one of the plurality of apertures in the free end of the flexible band for holding said band during a piston ring clamping and contacting operation.

In testimony whereof I have signed my name to this specification in the presence of two subscribing witnesses.

HARRY TROST.

Witnesses:
 FREEST BOHLAND,
 WILLIAM DETTMAR.